Patented Aug. 12, 1947

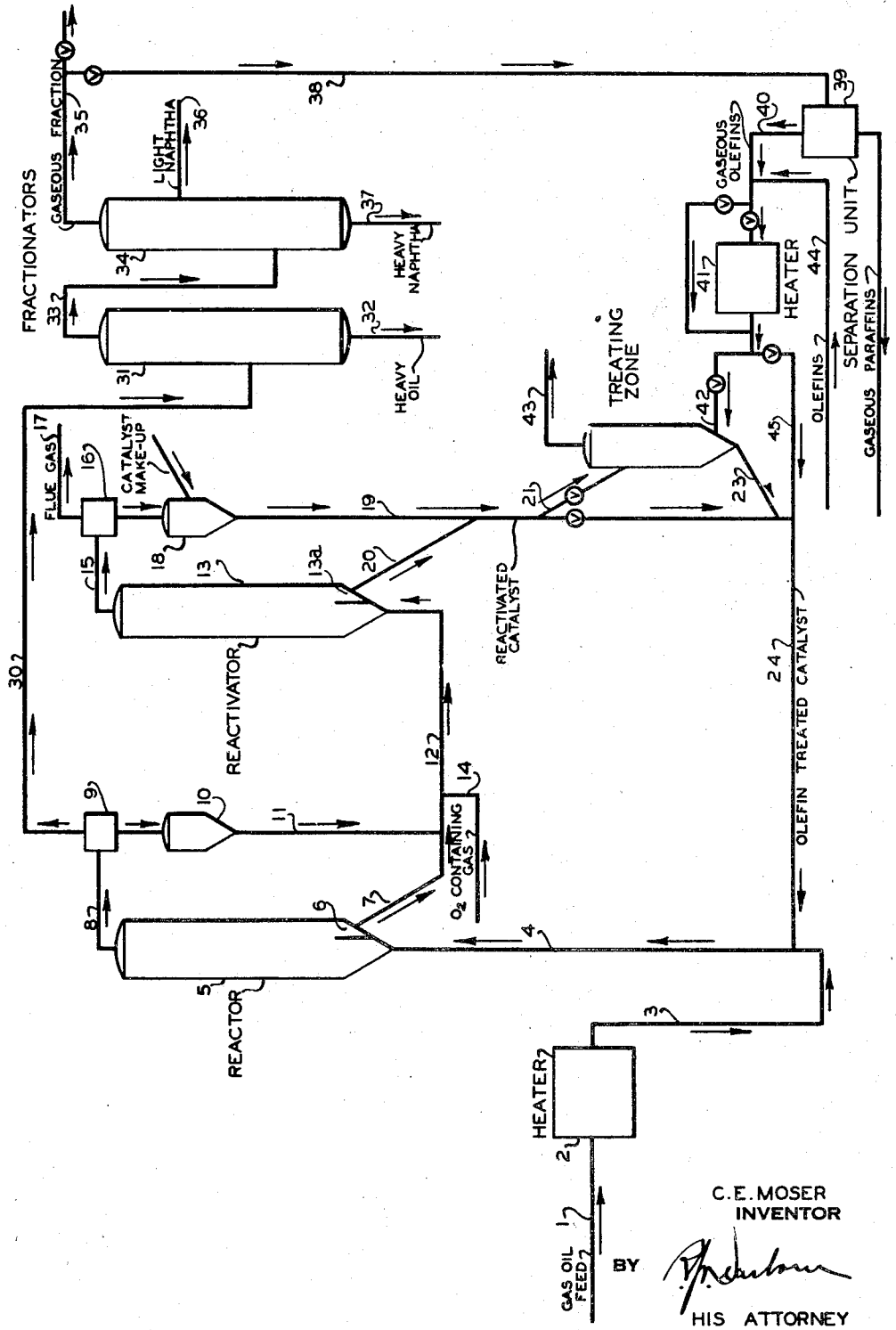

2,425,482

UNITED STATES PATENT OFFICE 2,425,482

PRETREATMENT OF REACTIVATED HYDROCARBON CRACKING CATALYST WITH NORMALLY GASEOUS OLEFINS

Charles E. Moser, Beacon, N. Y., assignor to The Texas Company, New York, N. Y., a corporation of Delaware Application February 26, 1944, Serial No. 524,016

6 Claims. (Cl. 196—52)

This invention relates to the catalytic conversion of hydrocarbons and particularly to a process of catalytic conversion involving treatment of the catalyst with olefin hydrocarbons at elevated temperature.

In accordance with the invention a solid catalyst in particle form, such as used in the cracking of hydrocarbons, is treated prior to contact with the feed hydrocarbons with a normally gaseous olefine such as propylene and butylenes. The treating temperature is advantageously in the range employed in the cracking or conversion reaction.

In the cracking of hydrocarbons with catalysts of the natural and synthetic clay type, treatment of the catalyst with olefins following the customary reactivation to remove carbonaceous material by combustion has been found advantageous from the standpoint of improving the octane rating of the gasoline produced as a result of cracking with the so-treated catalyst.

The treatment of the catalyst may be carried out in different ways. When the catalyst is disposed in a stationary bed in a reaction zone which is alternately onstream during hydrocarbon conversion and offstream during catalyst regeneration, normally gaseous olefins, such as propylene and butylenes, may be passed through the catalyst bed or mass subsequent to reactivation by burning of carbonaceous deposits and prior to passage of the feed hydrocarbons through the reactivated catalyst mass. The flow of olefins through the contact mass is conducted for a short period of time ranging from several seconds to 40 to 60 minutes.

When the catalyst is employed in the form of a moving bed of catalyst or in the form of a powder suspended in the hydrocarbon vapors passing through a reaction zone, the treatment of the catalyst with the normally gaseous olefins is advantageously carried out in a separate zone. It is customary in operations where the catalyst moves through the reaction zone to pass the used catalyst through a separate zone for regeneration wherein carbonaceous material is removed from the catalyst by combustion. In accordance with this invention the catalyst is passed from the combustion zone to a separate zone wherein it is brought into contact with the gaseous olefins at substantially the temperatures prevailing in the subsequent catalytic conversion of hydrocarbons, which temperatures may range from about 700 to 1000° F.

In this latter type of operation the separate treatment of the catalyst with the olefins may be carried out so that the gaseous olefins are used to force the reactivated catalyst back into the reaction zone. Thus, the catalyst from which the carbonaceous material has been removed by combustion and while still hot may be suspended in a stream of gaseous olefins flowing through a conduit, and the resulting stream of gaseous olefins containing suspended catalyst injected into the hydrocarbon conversion zone.

This latter type of operation is illustrated in the drawing to which reference will now be made.

As shown in the drawing, a gas oil feed is conducted from a source not shown through a pipe 1 to a heater 2 wherein the oil is vaporized and heated to a temperature in the range about 800 to 950° F. for example.

The vaporized gas oil is conducted through a pipe 3 to a conduit 4 which communicates with the lower portion of a vertical reaction vessel 5.

As will be explained later, the catalyst in powdered form is also introduced to the reactor through the conduit 4.

The hydrocarbon vapors and catalyst powder suspended therein rise through the reactor which is maintained at the cracking temperature so that catalytic cracking of the hydrocarbons takes place to a substantial extent.

Some of the catalyst powder falls towards the bottom of the reactor and accumulates within the baffled section 6 from which it is withdrawn through a pipe 7.

On the other hand, some of the catalyst powder passes out of the reactor with the hydrocarbon vapors flowing through a pipe 8.

Conditions of flow are controlled so that the relative proportions of catalyst powder accumulating in the baffled section 6 and passing out through the pipe 8 may be maintained at a predetermined ratio.

Pipe 8 discharges into a dust separating unit 9 which may be of the centrifugal or of the electrical type or may comprise both types.

The separated catalyst powder is drawn off to a hopper 10 from which it is discharged through a pipe 11.

Pipes 11 and 7 communicate with the pipe 12 which leads to the lower portion of a vertical reactivator 13. The reactivator 13 may be substantially similar to the reactor 5 in design.

A stream of air or other oxygen-containing gas is conducted from a source not shown through a pipe 14 through which the gas is injected into the pipe 12 in sufficient amount to force the catalyst powder through pipe 12 into the reactivator 13. The oxygen content of the gas is adjusted so as to maintain the proper conditions for combustion in the reactivator.

As in the case of the reactor 5, the catalyst powder is suspended in the body of gas within the reactivator 13, and carbonaceous material deposited on the catalyst undergoes combustion. Part of the catalyst accumulates in the baffled section 13a while part of it passes out of the top of the reactivator along with the combustion gases through a pipe 15.

The pipe 15 discharges into a dust separating unit 16 which may be similar to the unit 9.

The combustion gases from which powder has been separated are discharged through a pipe 17 while the separated powder is passed to a hopper 18.

From the hopper 18 the powder is conducted through a pipe 19. Powder accumulating in the baffled section 14 is also drawn off through a pipe 20, which also communicates with the pipe 19.

As indicated in the drawing, the pipe 19 may discharge into a pipe 21 leading to a treating zone 22 wherein the reactivated catalyst is treated with a normally gaseous olefin. The so-treated catalyst is discharged from the treating zone through a pipe 23 which communicates with a conduit 24, which in turn communicates with the previously mentioned conduit 4.

Referring again to the dust separating unit 9, the hydrocarbons comprising reacted and unreacted normally liquid hydrocarbons as well as gaseous hydrocarbons are discharged through a pipe 30 into a fractionator 31. Heavy components boiling in the range of gas oil are discharged from the bottom of the fractionator through a pipe 32, while the naphtha and lighter hydrocarbons pass overhead as a distillate through a pipe 33 leading to a fractionator 34.

The fractionator 34 may be operated so as to produce a plurality of fractions including a gaseous fraction removed through a pipe 35, a light naphtha fraction removed through a pipe 36, and a heavy naphtha fraction removed through a pipe 37. The gaseous fraction containing saturated and unsaturated hydrocarbons is advantageously conducted all or in part through a pipe 38 to a separation unit 39 wherein the olefin constituents are separated from the paraffin hydrocarbons. This separation may be effected by solvent extraction, extractive distillation, or by absorption in sulfuric acid: for example, propylene may be selectively absorbed in acid of about 85% concentration at room temperature and subsequently removed from the acid by heating at a temperature of about 160° F.

The separated gaseous olefins may be conducted through a pipe 40 and through a heater 41 wherein they are raised to a suitable temperature, for example 400 to 800° F.

The heated olefins are then discharged from the heater through a pipe 42 leading to the previously mentioned treating zone 22. The treating zone may comprise a vertical vessel having a series of baffles therein over which the catalyst powder flows as it descends to the bottom of the vessel. The heated olefin rises vertically through the vessel and is discharged therefrom through a pipe 43, the so-treated catalyst powder being discharged through the pipe 23 as already described.

Since the catalyst powder is already at a substantially elevated temperature, it may not be necessary to preheat the gaseous olefin, in which case the heater 41 may be by-passed as indicated.

Instead of, or in addition to, the olefins separated from the hydrocarbon products of reaction, a gaseous olefin from an extraneous source may be employed. Olefins so obtained may be introduced through a pipe 44 communicating with the pipe 40.

It is also contemplated that the treatment of the catalyst with olefins may be carried out entirely during passage of the catalyst powder and olefins through the conduit 24. In such case the treating zone 22 is not used, and the catalyst powder removed from the reactivator 13 is discharged by the pipes 19 and 20 directly into the conduit 24. In the conduit 24 the catalyst powder is suspended in a stream of olefins flowing therethrough from a pipe 45, the temperature being maintained such that the desired pretreatment of the catalyst is effected prior to its reintroduction to the reactor 5.

In accordance with the method of flow illustrated in the drawing, the olefins used for pretreating the catalyst and for conducting it through the conduit 24 pass into the reactor along with the catalyst so that these olefins are present during the course of the conversion reaction. During the conversion reaction the olefins may undergo polymerization and may also enter into other types of reaction. Olefins not so converted pass out of the reactor along with the hydrocarbon products of the conversion reaction.

By way of example, gas oil derived from East Texas crude was cracked by passing the vaporized heated oil through a stationary bed of catalyst. The catalyst was of the clay type, acid-treated bentonite, the particles being in the form of ⅛ inch pellets.

The gas oil had a boiling range of 500 to 700° F. and an A. P. I. gravity of 34 to 35. It was characterized by having an A. S. T. M. color in the range 2 to 7 and a carbon residue of .02% or substantially less than .2%.

The gas oil vapors at a temperature of 900 to 1000° F. were passed through the catalyst mass at a space velocity of about 2.2 volumes of gas oil liquid measured at 60° F. per volume of catalyst per hour. The flow of gas oil vapors through the catalyst was continued for a period of 4 hours with the following results:

| | | | |
|---|---|---|---|
| Reaction temperature, °F | 900 | 900 | 1000 |
| Propylene pretreatment | No | Yes | Yes |
| Nitrogen pretreatment | Yes | No | No |
| Per cent naphtha [1] basis gas oil | 14.5 | 14.9 | 16.6 |
| Gasoline tests: | | | |
| Initial boiling point, °F | 113 | 116 | 120 |
| 50% boiling point, °F | 237 | 233 | 239 |
| End point, °F | 377 | 380 | 376 |
| L-3 Octane | 80.8 | 82.3 | 82.4 |

[1] Average overall yield of 400° F. end point debutanized naphtha in volume per cent.

The foregoing octane values are determined by the knock test method described by the Ethyl Gas Corporation on page 11 of the May 5, 1937, issue of "National Petroleum News."

As indicated, the first experiment was made with catalyst which had been previously treated with nitrogen, whereas the catalyst used in the two other experiments had been pretreated with propylene. The olefin pretreatment consisted in passing a stream of propylene gas through the catalyst mass for a period of 30 minutes at the same temperature as prevailed during the subsequent cracking operation. The propylene was passed through the catalyst mass at the rate of about 79 cubic feet per hour per cubic foot of catalyst. Thereafter the flow of propylene gas was discontinued and gas oil vapor charged to the reaction zone.

As the data in the tabulation show, the octane value of the gasoline obtained was substantially greater when the catalyst had been preheated with propylene, the octane improvement amounting to about 1.5 to 1.6 points. There was also a small improvement in the yield of naphtha. These improvements are peculiarly the result of using olefins rather than saturated paraffins in treating the catalyst.

While the foregoing examples relate to the pretreatment of a stationary catalyst bed, nevertheless, it is contemplated applying the pretreatment to a moving or flowing catalyst such as is employed in continuous flow conversion processes wherein the catalyst moves continuously through the reaction zone. The accompanying drawing illustrates one type of operation wherein the catalyst moves through the reaction zone. Other types of moving catalyst operations may be employed, as for example, where a substantial body of the catalyst descends slowly as a fluid mass through the reaction zone countercurrently to a rising stream of feed oil vapors.

The olefin gas used in treating the catalyst may pass with the catalyst through the cracking or conversion zone and thus be in contact with the catalyst in the presence of the hydrocarbons undergoing conversion. Thus, it is contemplated that normally gaseous olefins and gas oil vapors may be charged simultaneously to the reaction zone, thereby obtaining gasoline of improved octane rating and superior to that obtained when carrying out the reaction in the presence of a normally gaseous paraffin instead of a normally gaseous olefin.

The catalyst used in the process may comprise acid-treated bentonites and synthetic silica alumina catalysts which are stable at high temperatures of the order of 1400 to 1600° F. and which are substantially free from alkali and alkaline earth metals. A satisfactory catalyst is a synthetic silica-alumina-zirconia catalyst containing about 100 mols of $SiO_2$, 2 mols of $Al_2O_3$, and 4 mols of $ZrO_2$.

In the foregoing example a specific rate of olefin flow through a stationary catalyst bed has been mentioned. It is contemplated that this rate of flow may vary over a fairly wide range, as for example, from about 25 to 200 cubic feet per hour per cubic foot volume of catalyst.

While cracking has been specifically mentioned, nevertheless, it is contemplated that the invention may have application to processes involving other types of reactions, including naphtha reforming and desulfurizing of hydrocarbons with a clay type catalyst, etc.

Obviously many modifications and variations of the invention as above set forth may be made without departing from the spirit and scope thereof, and therefore only such limitations should be imposed as are indicated by the appended claims.

I claim:
1. In the catalytic cracking of hydrocarbon feed oil higher boiling than gasoline by contact at elevated temperatures with a silica alumina cracking catalyst which is periodically reactivated to remove carbonaceous material by combustion the steps which comprise treating the reactivated catalyst prior to contact with said feed oil by contact with a normally gaseous hydrocarbon consisting essentially of olefins at substantially said elevated temperatures, then resuming said contact with feed oil in the substantial absence of olefins used for treating said catalyst.

2. In the catalytic cracking of hydrocarbon feed oil higher boiling than gasoline by contact with an active silica alumina cracking catalyst maintained at cracking temperatures which catalyst is reactivated to remove carbonaceous material by combustion, the steps which comprise subjecting the reactivated catalyst to contact with a normally gaseous hydrocarbon consisting essentially of an olefin having from 3 to 4 carbon atoms per molecule at substantially said cracking temperature for a short period of time and there after effecting contact between the so-treated catalyst and the feed hydrocarbons in the substantial absence of said olefin.

3. The process of cracking hydrocarbon oil to produce gasoline hydrocarbons of improved antiknock value which comprises heating vaporized feed oil higher boiling than gasoline to an elevated temperature in the range 700° F. and above, passing the heated vapors through a reaction zone, subjecting the vapors therein to contact with an active silica alumina cracking catalyst in solid particle form, continuing the flow of feed oil vapor through the reaction zone for a prolonged period of time, discontinuing contact between feed hydrocarbons and used catalyst which has become deactivated, reactivating said used catalyst in situ in the absence of said feed hydrocarbons by combustion of carbonaceous material deposited thereon during contact with feed hydrocarbons, thereafter passing a stream of olefin having from 3 to 4 carbon atoms per molecule at substantially said elevated temperature through the reaction zone in contact with the reactivated catalyst, continuing the flow of olefin through the reaction zone for a substantial period of time, discontinuing the flow of olefin, and then resuming the flow of feed oil vapor through the catalyst.

4. The process of converting higher boiling hydrocarbon oil into gasoline hydrocarbons by contact with a silica alumina cracking catalyst at cracking temperatures with comprises continuously passing a stream of heated feed oil vapor through a reaction zone, continuously introducing to said reaction zone a stream of said catalyst in solid particle form, effecting substantial cracking of said hydrocarbon by contact with the catalyst in the reaction zone at a predetermined elevated temperature in the range 700 to 1000° F., continuously removing from the reaction zone converted hydrocarbons and catalyst, passing removed catalyst through a zone of reactivation, subjecting it therein to contact with oxygen-containing gas under conditions such that carbonaceous material deposited on the catalyst is removed by combustion thereby reactivating the catalyst, withdrawing reactivated catalyst while still hot from the reactivation zone, subjecting withdrawn hot catalyst to contact with a gaseous medium consisting essentially of normally gaseous olefins at substantially said predetermined temperature for a short period of time, and then returning the olefin treated reactivated catalyst in the substantial absence of said olefin to the reaction zone.

5. The process of converting higher boiling hydrocarbon oil into gasoline hydrocarbons by contact with a silica alumina cracking catalyst at cracking temperatures which comprises continuously passing a stream of heated feed oil vapor through a reaction zone, continuously introducing to said reaction zone a stream of said catalyst in solid particle form, effecting substantial cracking of said hydrocarbon by contact with the catalyst in the reaction zone at a predetermined elevated temperature in the range 700 to 1000° F., continuously removing from the reaction zone converted hydrocarbons and catalyst, passing removed catalyst through a zone of reactivation, subjecting it therein to contact with oxygen-containing gas under conditions such that carbonaceous material deposited on the catalyst is removed by combustion thereby reactivating the catalyst, withdrawing reactivated catalyst while still hot from the reactivation zone, passing withdrawn catalyst to a treating zone, subjecting it therein to contact with a stream of normally gaseous olefin consisting essentially of an olefin having 3 to 4 carbon atoms per molecule at substantially said predetermined temperature for a short period of time, separately discharging olefin and treated catalyst from the treating zone, and returning treated catalyst in the substantial absence of olefin to the reaction zone.

6. The process of converting higher boiling hydrocarbon oil into gasoline hydrocarbons by contact with a silica alumina cracking catalyst at cracking temperatures which comprises continuously passing a stream of heated feed oil vapor through a reaction zone, continuously introducing to said reaction zone a stream of said catalyst in solid particle form, effecting substantial cracking of said feed oil by contact with the catalyst in the reaction zone at a predetermined elevated temperature, continuously removing from the reaction zone converted hydrocarbons and catalyst, separating converted hydrocarbons from the catalyst, passing separated hydrocarbons to a fractionating zone, fractionating therefrom a normally gaseous fraction containing unsaturated and saturated $C_3$ and $C_4$ hydrocarbons, separating unsaturated hydrocarbons from said gaseous fraction, passing removed catalyst through a zone of reactivation, subjecting it therein to contact with oxygen containing gas under conditions such that carbonaceous material deposited on the catalyst is removed by combustion thereby reactivating the catalyst, withdrawing the catalyst from the reactivation zone, passing withdrawn catalyst to a treating zone, subjecting it therein to contact with a stream of said separated, unsaturated hydrocarbons at substantially said predetermined temperature for a short period of time, separately discharging hydrocarbons and catalyst from the treating zone, and returning the treated catalyst in the substantial absence of said unsaturated hydrocarbons to the reaction zone.

CHARLES E. MOSER.

REFERENCES CITED

The following references are of record in the file of this patent:

UNITED STATES PATENTS

| Number | Name | Date |
|---|---|---|
| 2,035,467 | Faragher et al. | Mar. 31, 1936 |
| 2,270,715 | Layng et al. | Jan. 20, 1942 |
| 2,290,845 | Voorhees | July 21, 1942 |
| 2,310,244 | Lassiat | Feb. 9, 1943 |
| 2,326,779 | Houdry | Aug. 17, 1943 |
| 2,328,178 | Teter | Aug. 31, 1943 |
| 2,353,119 | Workman | July 4, 1944 |
| 2,325,516 | Holt | July 27, 1943 |
| 2,356,697 | Rial | Aug. 22, 1944 |
| 2,366,372 | Voorhees | Jan. 2, 1945 |
| 2,377,087 | Linn | May 19, 1945 |
| 2,348,156 | Sheppard | May 2, 1944 |

Certificate of Correction

Patent No. 2,425,482.   August 12, 1947.

CHARLES E. MOSER

It is hereby certified that error appears in the printed specification of the above numbered patent requiring correction as follows: Column 5, line 8, for "preheated" read *pretreated*; and that the said Letters Pattent should be read with this correction therein that the same may conform to the record of the case in the Patent Office.

Signed and sealed this 21st day of October, A. D. 1947.

[SEAL]

THOMAS F. MURPHY,
*Assistant Commissioner of Patents.*